(12) United States Patent
Petersen et al.

(10) Patent No.: US 8,347,501 B2
(45) Date of Patent: Jan. 8, 2013

(54) METHOD FOR MANUFACTURING WTG BLADE HAVING A SPAR

(75) Inventors: Leif Kappel Petersen, Lem St. (DK); Olav Davis, Hamble (GB)

(73) Assignee: Vestas Wind Systems A/S, Aarhus N (DK)

( * ) Notice: Subject to any disclaimer, the term of this patent is extended or adjusted under 35 U.S.C. 154(b) by 61 days.

(21) Appl. No.: 12/835,372

(22) Filed: Jul. 13, 2010

(65) Prior Publication Data

US 2011/0020131 A1    Jan. 27, 2011

Related U.S. Application Data

(60) Provisional application No. 61/226,383, filed on Jul. 17, 2009.

(30) Foreign Application Priority Data

Jul. 17, 2009  (DK) ................................ 2009 70068

(51) Int. Cl.
*B21D 53/78* (2006.01)
*B25B 27/14* (2006.01)
*F03D 11/02* (2006.01)

(52) U.S. Cl. ............... 29/889.7; 29/281.4; 29/281.6; 29/466; 29/889; 416/226; 425/150

(58) Field of Classification Search .......... 29/283, 29/464, 466, 468, 559, 889, 889.7, 281.1, 29/281.4, 281.6; 416/226, 229 R; 425/450.1, 425/451.9, 470
See application file for complete search history.

(56) References Cited

U.S. PATENT DOCUMENTS

| | | | | |
|---|---|---|---|---|
| 2,423,700 A | * | 7/1947 | Hardy | 416/229 R |
| 2,884,077 A | * | 4/1959 | Stamm et al. | 416/226 |
| 2,950,766 A | * | 8/1960 | Huber | 416/226 |
| 3,004,607 A | * | 10/1961 | Linnabery et al. | 416/226 |
| 3,171,163 A | | 3/1965 | Ford et al. | |

(Continued)

FOREIGN PATENT DOCUMENTS

DE    31 13079    10/1982

(Continued)

OTHER PUBLICATIONS

Anders Budtz-Olsen; First Technical Examination Report issued in Denmark priority application No. PA 2009 70068; Feb. 26, 2010; 4 pages; Denmark Patent and Trademark Office.
European Patent Office, search report issued in related European Application No. 10166590.9 dated Nov. 1, 2010.

*Primary Examiner* — Alexander P Taousakis
(74) *Attorney, Agent, or Firm* — Wood, Herron & Evans, LLP (57) ABSTRACT

Within the field of wind turbine generators (WTG), to provide a consistent way of manufacturing a WT blade there is disclosed a blade mould and a blade spar fixture to support the spar in the mould so as to provide a fixed predetermined relative position, and preferably also orientation, between at least a root end, such as a bushing in the root end of the blade spar, and a root end of the mould. Overall consistency is also obtained in that hereby a blade with anticipated aerodynamic and strength characteristics is provided, among others in that at least adjacent to the root of the spar there is substantially the same distance for a cured adhesive between an innermost surface of each of blade shells and an outermost surface of the spar.

17 Claims, 9 Drawing Sheets

U.S. PATENT DOCUMENTS

| | | | |
|---|---|---|---|
| 4,095,322 A * | 6/1978 | Scarpati et al. | 29/889.6 |
| 4,732,542 A * | 3/1988 | Hahn et al. | 416/226 |
| 4,892,462 A | 1/1990 | Barbier et al. | |
| 5,570,631 A * | 11/1996 | Leahy et al. | 100/211 |
| 7,895,746 B2 * | 3/2011 | Bech et al. | 29/889.7 |
| 2007/0036659 A1 * | 2/2007 | Hibbard | 416/233 |
| 2007/0251090 A1 | 11/2007 | Breugel et al. | |
| 2011/0100542 A1 * | 5/2011 | Faulkner et al. | 156/245 |

FOREIGN PATENT DOCUMENTS

| | | |
|---|---|---|
| EP | 0 037 987 | 10/1981 |
| WO | 2006066593 | 6/2006 |
| WO | 2007110459 | 10/2007 |

\* cited by examiner

METHOD FOR MANUFACTURING WTG BLADE HAVING A SPAR

CROSS-REFERENCE TO RELATED APPLICATIONS

This application claims priority under 35 U.S.C. §119(a) to DK Application No. PA 2009 70068, filed Jul. 17, 2009. This application also claims the benefit of U.S. Provisional Application No. 61/226,383, filed Jul. 17, 2009. Each of these applications is incorporated by reference herein in its entirety.

TECHNICAL FIELD

The invention relates to wind turbine generator blades and to a wind turbine generator blade mould and a method of manufacturing a wind turbine generator blade having a spar.

BACKGROUND

A blade of a wind turbine generator (WTG or just WT) is an elongated structure having an airfoil-shaped profile suitable for providing an aerodynamic lift upon relative movement through air. The blades of the WTG may interchangeably be called "rotor blades" or "wind turbine blades" or "blades" within this context.

Factors such as the aerodynamic lift created by the blade, any noise created by the blade when moving through the air and a wear-resistance of the blade, may vary in dependence of the shape of the blade, the size of the blade, the structure of the blade, angle of attack, the materials of which the blade is manufactured or the way the blade is manufactured. A blade which does not create the aerodynamic lift which it was anticipated to create, may give rise to unanticipated loads which may cause unanticipated wear.

Some previous techniques have proposed control of aerodynamic lift or control of aerodynamic noise of wind turbine generators by using methods of, for example, rotor speed control. Others use special mechanisms to control aerodynamic lift of the blades.

WO2007110459 describes cyclical activation of mechanisms for reducing noise by reducing an aerodynamic lift of each WTG blade during its pass through a circular sector S less than or equal to 160 degrees.

A possible disadvantage of the previous solutions is that in most cases a reduction of the noise produced or a reduction of an aerodynamic lift involves a reduction of the performance and efficiency of the WTG, measured in electrical output at given wind conditions.

Another possible disadvantage of one or more of the previous solutions is that the mechanisms and systems for preventing vibrations or aerodynamic lift may themselves necessitate maintenance or repair and hereby possibly reduce the performance and efficiency of the WTG, measured in electrical output relative to a cost for any maintenance or repair needed.

A still further possible disadvantage of one or more of the previous solutions is that the mechanisms and systems for preventing vibrations or unanticipated aerodynamic lift may themselves increase a cost of the WTG.

SUMMARY

Various embodiments of the present invention provide an improved method of manufacturing a wind turbine blade having a wind turbine blade spar, an improved wind turbine blade mould and an improved wind turbine blade.

One embodiment in accordance with aspects of the invention provides a blade which creates an anticipated aerodynamic lift. Another embodiment provides a wind turbine blade which is stronger than previously known wind turbine blades. Still a further embodiment provides a blade that has a structure which is stronger than that of previously known blades.

One embodiment provides a method of manufacturing a wind turbine blade which method has an increased controllability with regard to one or more factors which may affect consistency of the manufacturing method.

Preferably, various embodiments of the invention alleviate, mitigate or eliminate one or more of the above or other disadvantages singly or in any combination.

In accordance with a first aspect of the invention, there is provided a method of manufacturing a wind turbine blade having a wind turbine blade spar, the method comprising:
providing a lower part of a wind turbine blade mould,
supporting the lower part by a supporting structure,
providing a wind turbine blade shell in the lower part,
positioning a wind turbine blade spar adjacent to the wind turbine blade mould,
supporting the wind turbine blade spar relative to the wind turbine blade shell by a spar fixture so as to provide a fixed predetermined relative position between at least a root end of the wind turbine blade spar and at least a root end of the wind turbine blade shell in the wind turbine blade mould.

The fixed predetermined relative position is at least elected so that at least the root end of the spar is positioned having an outermost surface of the spar in substantially the same distance from an innermost surface of the blade shell, along the circumference of the blade shell. As will be further described herein, the described distance is preferably, among others, also elected so as to optimize a thickness of a curable adhesive or resin layer or seam between the spar and the blade shell.

Thus an improved method of manufacturing a wind turbine blade having a wind turbine blade spar is provided. The improvement may lie therein that when supporting the wind turbine spar as disclosed, a manufacturing method is provided where an increased controllability of the position of the spar relative to the wind turbine shell is provided. With this controllability, an improved consistency of the manufacturing method may be provided, and in consequence a wind turbine blade having improved consistency of its structure and thereby, among others, improved consistency of its performance. Possible advantages of a blade manufactured in the mould are in consequence also, as it will be further described and elucidated herein, that a cone angle, out of a rotational plane of the blade, is controllable and can be provided as it was intended and anticipated to be.

In particular, a blade provided as described herein has, as an example, a possible advantage that a reduction of any noise produced by the blade or obtaining of an anticipated aerodynamic lift and load is provided while maintaining or even improving the performance and efficiency of the WTG, measured in electrical output at given wind conditions. In short, a possible reason for this is that a cause of one or more possible problems with a blade is prevented from occurring. This is contrary to most of the previous solutions where various attempts to solve problems which are possibly due to one or more inconsistencies of a WT blade are treated after they occur.

When supporting the wind turbine blade spar in the mould relative to the wind turbine blade shell includes providing the spar fixture as a support between a root end of the wind turbine blade spar and at least one of the blade mould, the supporting structure and the ground, especially the position of the relatively heavy root end of the spar, is controllable.

When positioning the wind turbine blade spar adjacent to the wind turbine blade mould and supporting the wind turbine blade spar in the mould relative to the wind turbine blade shell includes lowering a supporting element comprised in the spar in a gravitational direction into the spar fixture and thereby the spar into the fixed predetermined relative position, a simple and yet effective preferred solution of positioning the wind turbine spar precisely relative to the wind turbine shell in the wind turbine blade mould can be provided. Preferably, the final precise position of the spar relative to the wind turbine blade shell is achieved solely by lowering the spar, only in the gravitational direction and by use of gravity, into the final position of the spar in the spar fixture.

An alternative to this, though a less preferred solution, is to obtain a positions as close as possible to the final position of the spar by moving and holding the spar with a crane or the like, and hereafter forcing the spar to its final position by inserting supporting elements, such as bolts, through a hole in the spar fixture and into bushings, threads or openings in the spar root and possibly providing the final position by tightening the bolts in the threads. An embodiment of this solution is shown in FIGS. 4-7.

A layer and/or a seam of curable adhesive may be provided before or after the spar obtains its final position. The layer and/or seam is provided between an innermost surface of the blade shell and an outermost surface of the spar. A reason that the preferred solution of obtaining the final position is preferable compared to, for example, the less preferred solution, may be that it may prove relatively difficult to stop and hold the spar as close as possible to its final position by a crane or the like.

Still further, a possible advantage by providing the final position as preferred herein is that any curable adhesive seams or layers already provided on the spar or on the blade shell, are not touched more than once, and thereby, as an example, are not smeared across surfaces not intended to be provided with adhesive.

In accordance with a second aspect there is provided a wind turbine blade mould comprising:

a wind turbine blade mould support structure, a wind turbine blade spar fixture adapted to support the wind turbine blade spar in the wind turbine blade mould relative to the wind turbine blade mould so as to provide a fixed predetermined relative position between at least a root end of the wind turbine blade spar and at least a root end of the wind turbine blade mould.

The fixed predetermined relative position is at least elected so that at least the root end of the spar is positioned having an outermost surface of the spar in substantially the same distance from an innermost surface of the blade mould, along a circumference of the blade mould.

Thus an improved wind turbine blade mould is provided.

The improvement may lie therein that when the spar is fixed in the predetermined relative position relative to the mould as described, a possible advantage is that a mould for manufacturing blades having an increased consistency and strength is provided. A reason that the strength may increase may be that the fixed predetermined relative position between the parts ensures a predetermined structural strength of a blade assembled in the blade mould.

Furthermore, especially when the spar fixture is adapted to fix the wind turbine blade spar in a rotational direction around a centre axis in the root end of the wind turbine spar, a possible advantage is that a rotation of the spar relative to the blade mould is prevented. Hereby a possible advantage is that a rotational position of the spar root relative to the mould, in which mould a blade shell is to be assembled with the spar, is controlled by the spar fixture. Accordingly, an angular orientation of an aerodynamic shape of a wind turbine blade moulded and assembled in the mould is as anticipated relative to, for example, an angular orientation reference point in the root of the blade. Furthermore, the angular orientation reference point, among others for setting up a reference for a pitch angle of the blade, for example, relative to a hub, can be positioned in the rotational direction as predetermined relative to the aerodynamic shape of the wind turbine blade. By providing a correct reference point, among others to be used as a reference for pitching the blade profile in order to achieve a wanted angle of attack of the blade relative to the wind, an improved performance of the WTG may be obtained.

Furthermore, by fixing the spar in the rotational direction in the mould by the spar fixture as described, any cone angle of the blade, out of the rotational plane of the blade, is also fixed and there is, for example, not any angular part of such cone angle which is falsely rotated and hereby providing a sweep angle between blades which is different from the intended sweep angle.

When the wind turbine spar is provided with at least one of openings for root bushings and root bushings, and the spar fixture is adapted to be fixed to the wind turbine spar via the openings or the root bushings, a possible advantage is that no additional fix points are needed in the spar.

When the spar fixture comprises at least one opening or recess for insertion of a supporting element in the direction of gravity, a solution for providing the preferred lowering of the spar into its final predetermined position in the mould is provided. Alternatively, the spar may comprise an indentation for hooking up with a protrusion of the spar fixture, or the spar is provided with one or more protrusions or pins extending from the root which can be lowered into the spar fixture.

In accordance with an exemplary embodiment of the mould, the wind turbine blade mould comprises two blade mould parts, an upper and a lower blade mould part, and one end of the spar fixture is adapted to be fixed to the lower mould part or a blade mould support structure for the lower mould part.

When the openings in the root end are provided for insertion of root bushings and the bushings in the root end of the spar are bushings for attachment of the spar to a wind turbine hub, an exemplary embodiment is described, and when the wind turbine spar is adapted to be supported by a spar fixture via bushings in a root end of the spar and via the wind turbine blade mould support structure, a possible advantage is that any fixed position and/or orientation of the spar is fixed to points where the blade is later fixed to the hub.

When the wind turbine spar is fixed in at least two points in the root end, which points are offset from a centre axis of the wind turbine spar, a possible advantage is that a fixture is provided which is more stable than, for example, only fixing the spar in, for example, an uppermost point of the spar when positioned in the mould. It may be preferred to only fix the spar in two points in the root end, one on each side of a centre of the wind turbine spar.

In accordance with a third aspect of the invention there is provided a wind turbine blade comprising:

a spar having an outermost surface, two blade shells, each blade shell having an innermost surface towards the outermost surface of the spar, the two blade shells being attached to the spar and to each other, wherein at least adjacent to a root end of the spar there is substantially the same distance between an innermost surface of each of the blade shells and the outermost surface of the spar.

In correspondence with the above, possible advantages are that the fixed predetermined relative position can be elected so that at least the root end of the spar is positioned with an outermost surface of the spar in substantially the same distance from an innermost surface of the blade shell, along the circumference of the blade shell. The described distance is preferably, among others, as will be further described herein, also elected so as to optimize a thickness of a curable adhesive or resin layer or seam between the spar and the blade shell. In particular, it is hereby possible to provide a wind turbine blade wherein the substantially same distance, at least adjacent to the root end, between the innermost surface of the blade shells and the outermost surface of the spar provides a space, which space consists only of a layer of cured adhesive. Examples of possible advantages hereby are that a wind turbine blade having a consistent strength and consistent direction of the spar relative to a root plane is provided.

It is to be understood that the advantages described herein may be seen as possible advantages provided by the invention, but it may also be understood that the invention is particularly, but not exclusively, advantageous for obtaining one or more of the described advantages. In general, the various aspects and advantages of the invention may be combined and coupled in any way possible within the scope of the invention.

These and other aspects, features or advantages of the invention will be apparent from and elucidated with reference to the embodiments described hereinafter.

BRIEF DESCRIPTION OF THE DRAWINGS

Embodiments of the invention will be described and explained, by way of example only, with reference to the drawings, in which.

DETAILED DESCRIPTION

Figure 1:
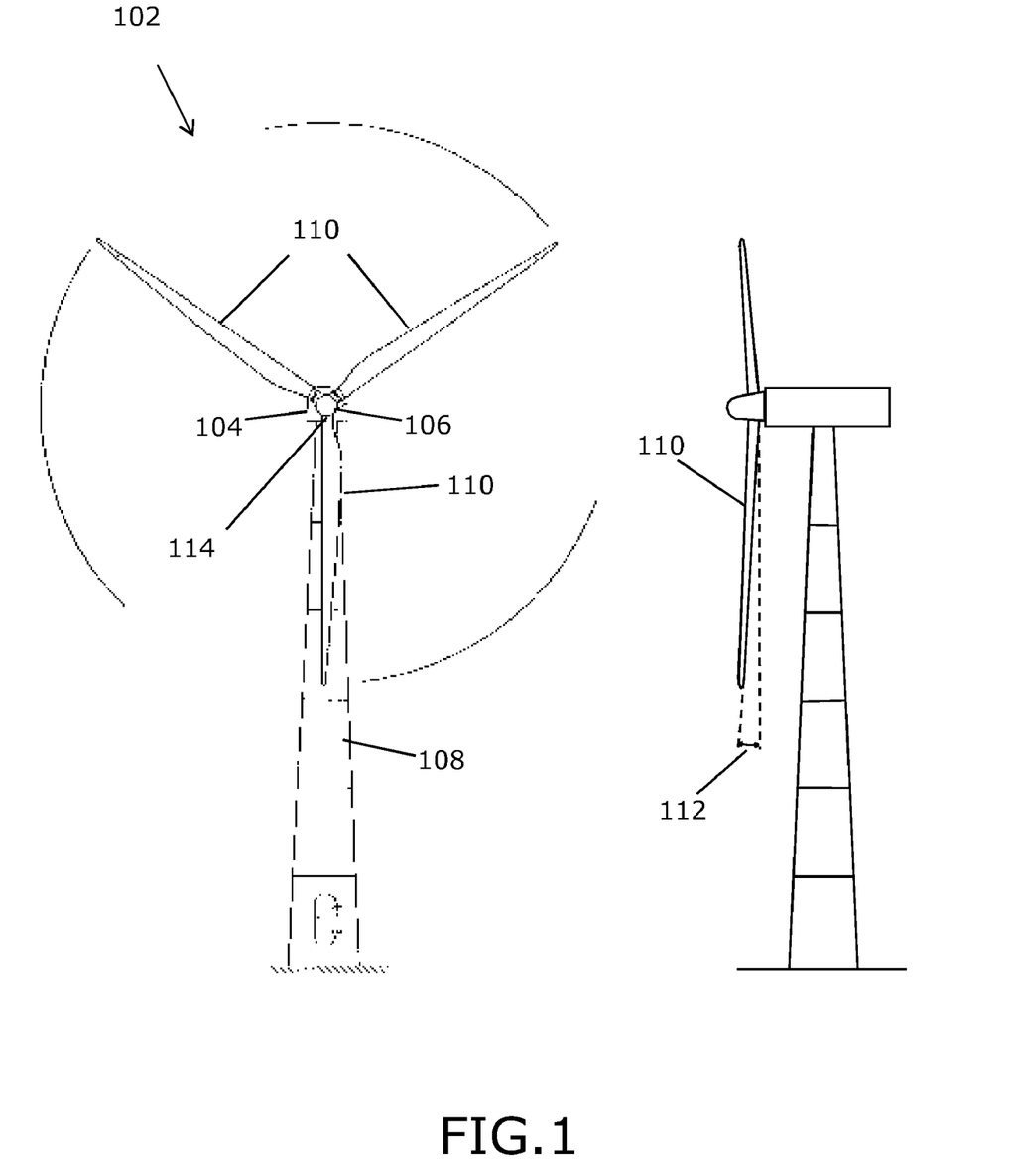
FIG. 1 shows a reference WTG.

FIG. 1 shows a wind turbine generator 102 with a nacelle 104, and a hub 106 pivotally mounted to the nacelle 104 via a shaft. The nacelle 104 is mounted on a wind turbine tower 108 via a rotary joint. The hub 106 of the wind turbine includes three wind turbine blades 110 attached to the hub in a root end 114 of the blades. The hub rotates around a shaft centre axis of the wind turbine in a rotational plane substantially perpendicular to the centre axis. The length of the blades of the wind turbine in the shown example is approximately 40 meter, but blade lengths between 25 and 70 meters are also usual.

In a rotational plane of the blades, it follows from the figure that the blades are split by a sweep angle of 120 degrees from each other. To the right of the drawing the wind turbine is shown in a side view. From the side view it follows that the wind turbine blades are coned in a cone angle 112 out of the rotational plane. The blades may pitch around a pitch axis, not illustrated, the pitch axis following a longitudinal extension of the coned blade. Inside each of the blades there is provided a WT blade spar.

Figure 2:
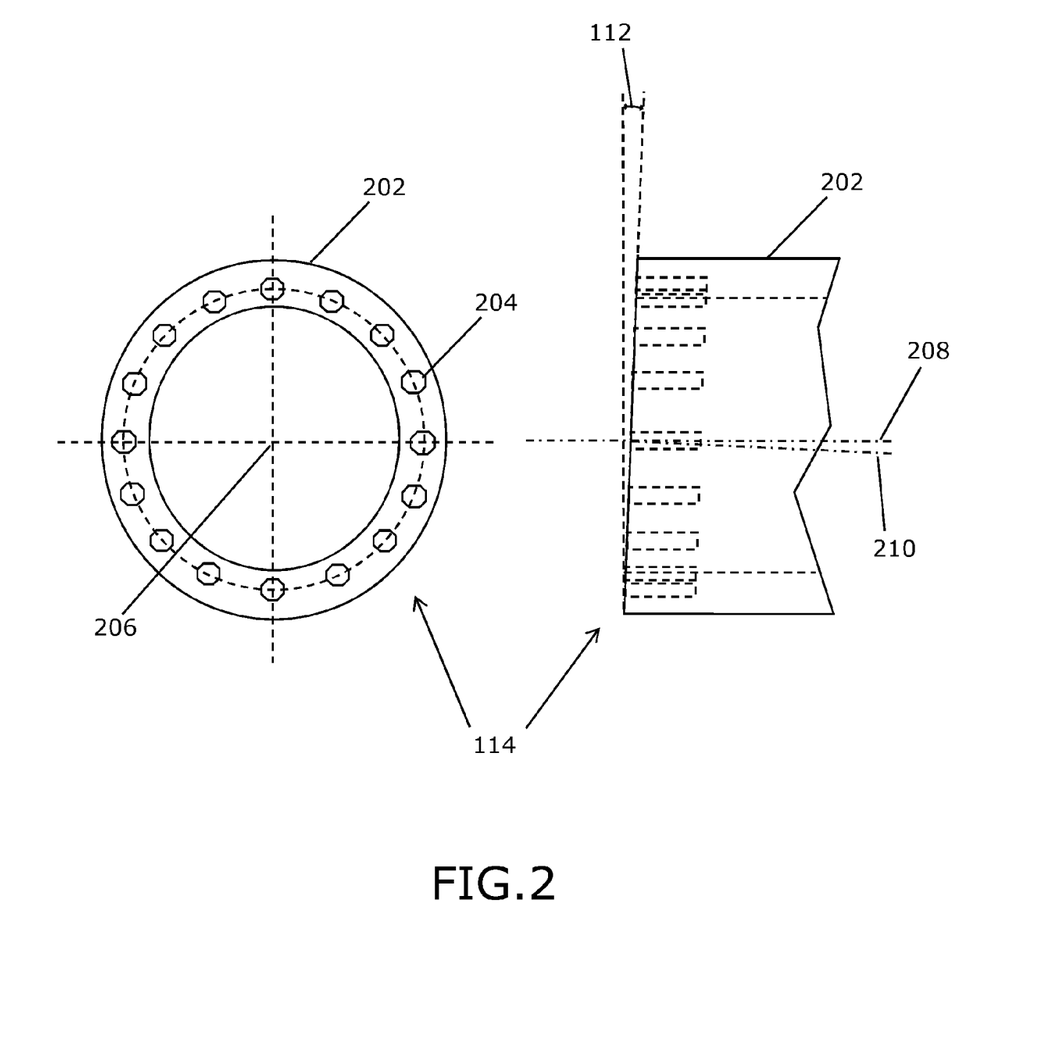
FIG. 2 illustrates a root end of a WT spar in end and side views.

FIG. 2 illustrates a root end of a WT spar 202 in an end view and a piece of the spar in a side view to the right. A material thickness of the spar and dimensions of the openings or root bushings 204 in the spar etc. are only chosen for illustration purpose. It follows from the figure that a root plane provided by a planar end of the spar is provided with the cone angle 112 relative to the longitudinal extension of the spar 202. Thus, a centre axis 208 of the spar is different by an angle equal to the cone angle 112 from a pitch axis 210. The pitch axis is perpendicular to the planar root plane.

The bushings 204 for attachment of the spar to the hub when the spar is assembled with blade shelves are distributed as illustrated on a circle around a centre point 206 of the centre axis of the root end of the spar. For illustration purposes the ellipse form of the material thickness of the root end of the spar is somewhat exaggerated. The ellipse form of the material thickness of the spar is due to the cone angle.

Figure 3:
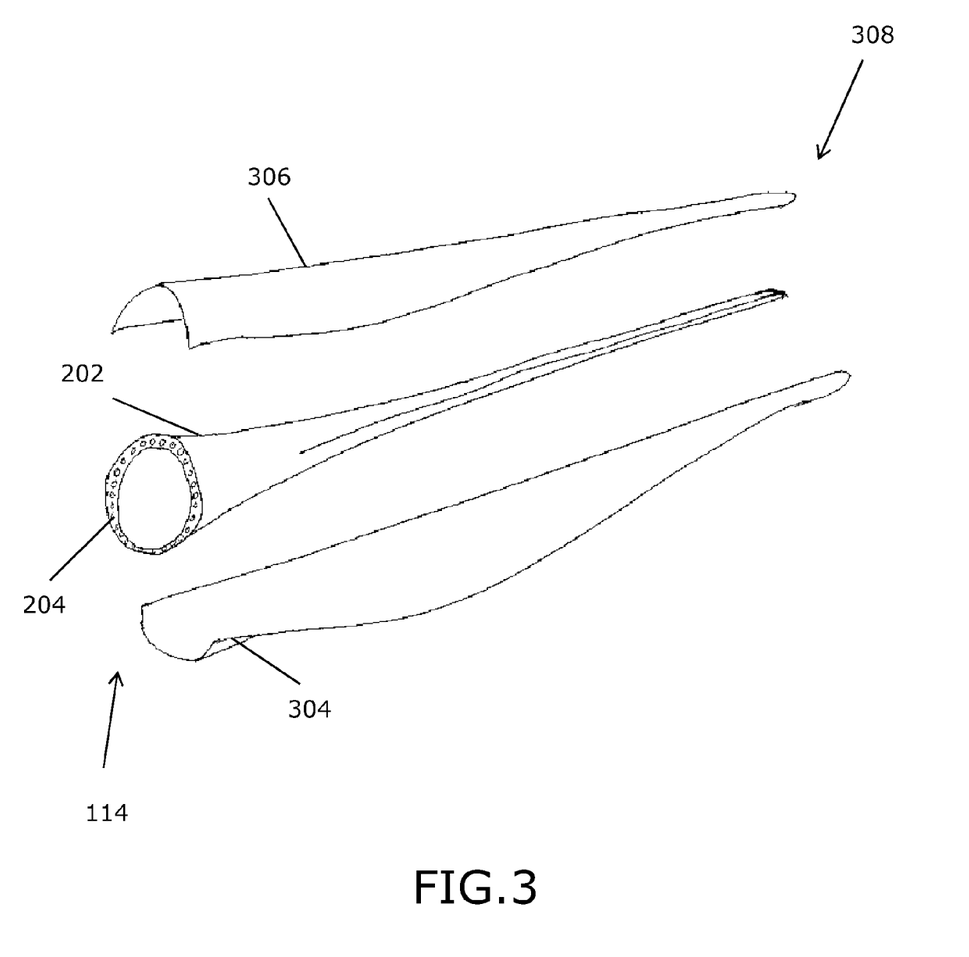
FIG. 3 illustrates the WT blade spar and two WT blade shells.

FIG. 3 illustrates the WT blade spar 202 and two WT blade shells, a lower WT blade shell 304 and an upper WT blade shell 306 prior to their assembly with each other. It can be seen that the spar 202 has a shape in the longitudinal direction which shape at least to some extent follows the form of the WT blade shells 304 and 306 and is thus relatively wide and substantially circular in the root end 114 and relative narrow, flat and thin in a tip end 308. For simplicity this actual change of the shape of the spar along its longitudinal extension is only illustrated in FIG. 3 and not shown in the FIGS. 2, 6, 7, 9, 10, 11, 12, 13 and 14.

Figure 4:
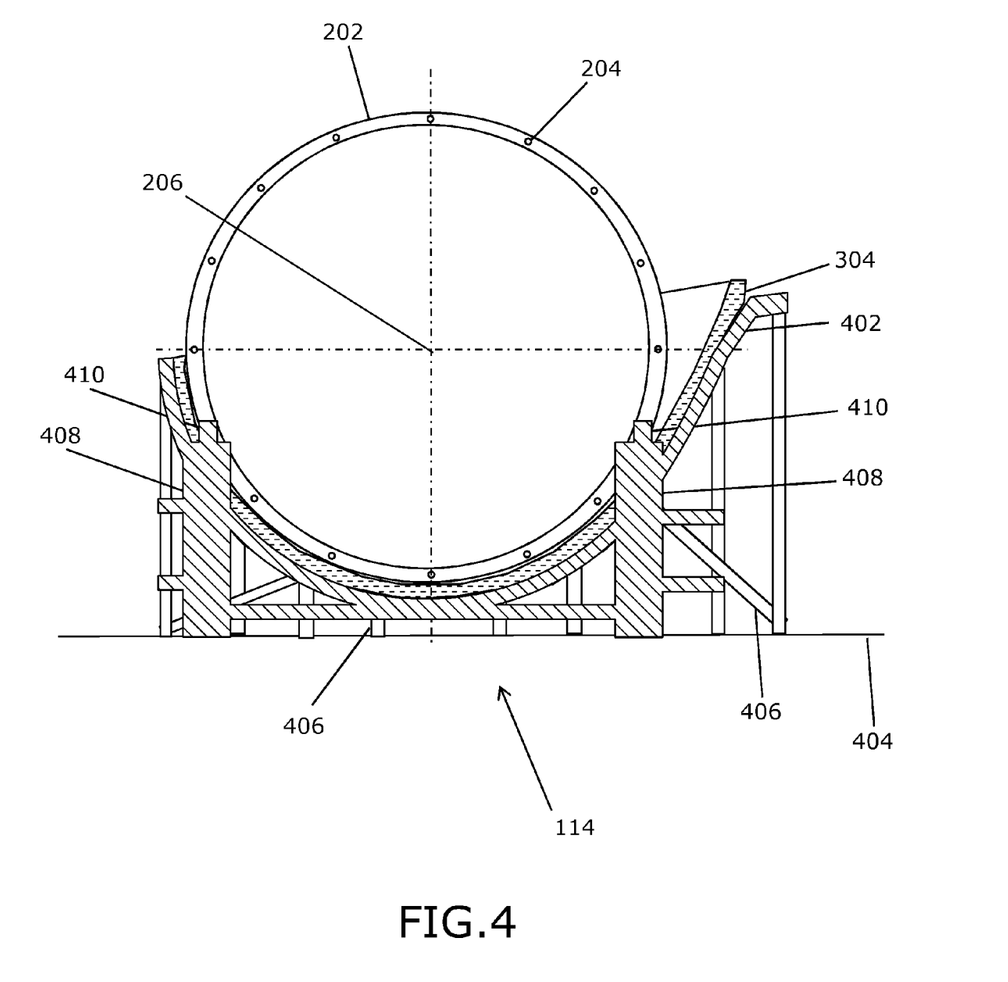
FIG. 4 is a view from a root end of a lower part of a WT blade mould and a spar fixture, etc.

FIG. 4 illustrates an end view of the spar with a centre point 206 from the root end 114 of a lower part 402 of a WT blade mould. The mould in the shown embodiment is both used for moulding the lower WT blade shell 304 and for assembly of the lower blade shell 304 with the WT spar 202. The lower mould part 402 is supported to the ground 404 with a supporting structure 406. In the figure there is illustrated a spar fixture 408 adapted to support the WT blade spar 202 in the wind turbine blade mould relative to the WT blade mould so as to provide a fixed predetermined relative position between at least a root end 114 of the WT blade spar 202 and at least a root end of the wind turbine blade mould.

By providing two fix points 410, offset from the centre axis 206, on the root of the spar 202 and connecting these fix points 410 to the spar fixture, the spar fixture is adapted to fix the wind turbine blade spar in a rotational direction around the centre axis in the root end of the wind turbine spar. In the figure it is illustrated that the spar fixture is adapted to fix and support the wind turbine blade spar to both the WT blade mould support structure and the ground. In the shown embodiment the spar fixture is fixed to the support structure by welding. Possibly the support to the ground may not be fixed in a longitudinal direction in order to allow extension of the mould when a mould temperature increases.

At the fix points 410 the WT spar 202 is adapted to be supported by the spar fixture 408 via bushings 204 in the root end 114 of the spar 202 and via the wind turbine blade mould support structure 406. The WT spar is fixed in at least two points in the root end, which points are offset from a centre axis of the wind turbine spar.

Figure 5:
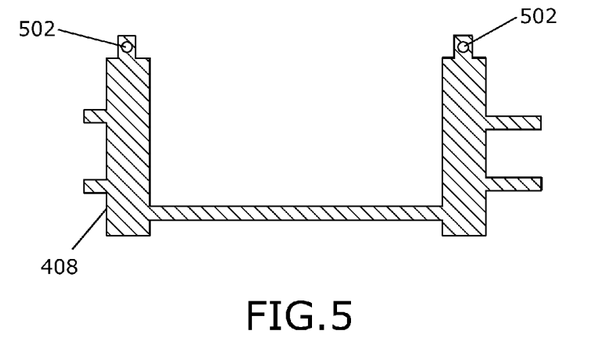
FIG. 5 illustrates a first embodiment of the WT spar fixture.

FIG. 5 illustrates a first embodiment of the WT spar fixture 408 as shown in FIG. 4. It follows that in the top of each of a left and right side of the spar fixture 408 there are provided holes 502 for insertion of supporting elements such as bolts or pins (shown in FIG. 7 with reference number 704).

Figure 6:
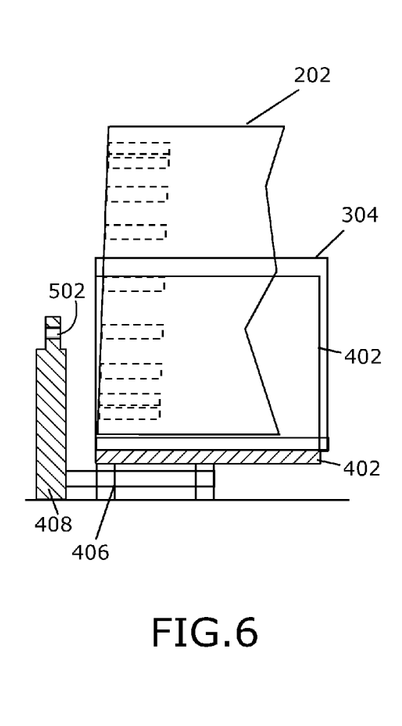
FIG. 6 illustrates a side view transverse to the view in FIG. 5.

FIG. 6 illustrates a side view transverse to the view in FIG. 5 of the WT spar fixture 408 in accordance with the first embodiment. In this figure the spar fixture is illustrated in conjunction with a root section of the lower WT blade mould 402 and the supporting structure 406 for the lower blade shell mould 402. A section of the lower blade shell 304 is also shown in the side view. For illustration purposes, the root end of the spar 202 in the side view, the lower blade shell 304 and the lower blade mould 402 are illustrated as transparent, at least in part, in the FIGS. 6, 7, 9, 10, 11, 12, 13 and 14. The parts mentioned to be illustrated as transparent are not actually transparent.

As illustrated in FIG. 6 the lower part 402 of a wind turbine blade mould is provided, the lower part of the WT mould is supported by the supporting structure 406, the WT blade shell 304 is provided in the lower mould part 402, and the wind turbine blade spar 202 is positioned adjacent to the wind turbine blade mould with the spar fixture as close to its final fixed predetermined position in the mould as possible by a crane or the like.

Figure 7:
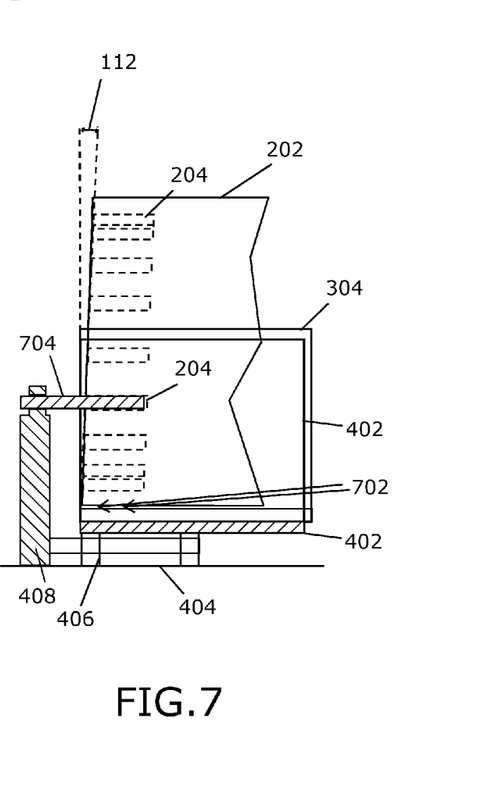
FIG. 7 illustrates the WT spar fixture in accordance with the first embodiment when supporting the spar.

FIG. 7 is an illustration of a side view of the situation shown in FIG. 4. FIG. 7 illustrates the WT spar fixture 408, e.g., shown in FIG. 6, in accordance with the first embodiment along with the mould 402 and its supporting structure 406 in a situation where the spar 202 is supported relative to the lower blade shell and the mould by the spar fixture via a supporting element 704, such as a bolt or pin. The bolt 704 is inserted through the through-going hole 502 in the spar fixture 408 and into a bushing 204 in the root end of the spar 202. The final fixed position of the spar 202 is obtained by tightening the bolts in threads, not illustrated, in the bushings 204.

The final position of the spar 202 in the lower blade mould 402 is predetermined so as to provide a space 702 adequate for a layer and/or one or more seams of adhesive between an innermost surface of the blade shell 304 and an outermost surface of the spar 202. A thickness of the layer is preferably in the interval between 1 and 5 mm. A layer thicker than 5-6 mm or a layer thinner than 1-1.5 mm may provide a connection which is not optimal, e.g., not optimal for the strength of the connection. Especially it is important that the thickness of the layer is substantially the same everywhere on the outermost surface on an outer circumference of the spar, i.e., towards both the lower blade shell 304 and towards the upper blade shell 306, among others to provide a connection with substantially the same strength along the outer circumference of the spar, at least in the root end. This is shown in more detail in FIG. 15.

Towards the tip 308 of the spar, the weight of the spar 202 per length relative to a surface area which this length of the spar rest on is relatively low compared to at the root end. In consequence and as an example, a tip end part of the spar, which tip end is unsupported relative to the blade shell 304, may not sink too much into, for example, a layer of curable adhesive prior to curing the adhesive.

FIGS. 7, 10, 12 and 14 all illustrate a mould where supporting the wind turbine blade spar is provided via at least one supporting element 702, 902, 1102, 1402 different from and separated from a blade shell.

Figure 8:
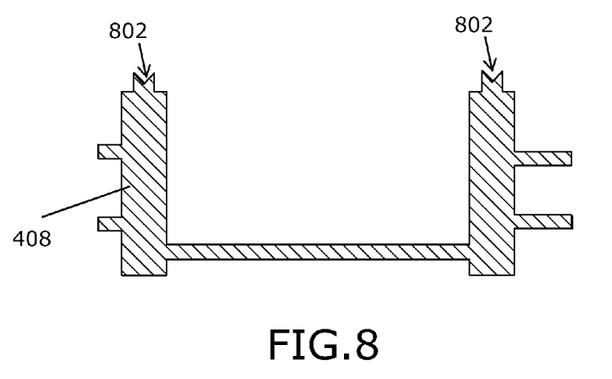
FIG. 8 illustrates a second embodiment of the spar fixture.
Figure 9:
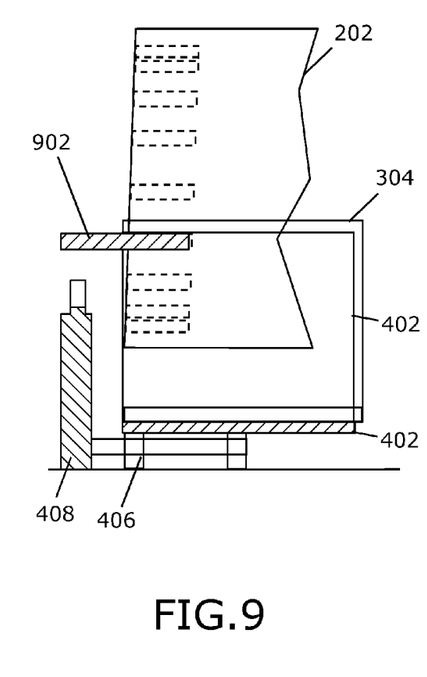
FIG. 9 is a side view of the second embodiment.

FIG. 8 illustrates a second embodiment of the spar fixture, and FIG. 9 illustrates a side view of the second embodiment of the spar fixture along with the mould etc.

FIGS. 8, 9, 10, 11 and 12 all illustrate a spar fixture and a method of manufacturing a WT blade with a spar 202 where the spar fixture includes at least one opening 1202 or recess 802 for insertion of a supporting element 902, 1102 and 1204 in the direction of gravity. It is illustrated that the wind turbine blade spar is positioned adjacent to the wind turbine blade mould and that the wind turbine blade spar 202 is supported in the mould relative to the wind turbine blade shell. Supporting and fixing the spar includes lowering the spar in a gravitational direction into the spar fixture 408 and thereby into the fixed predetermined relative position.

Figure 10:
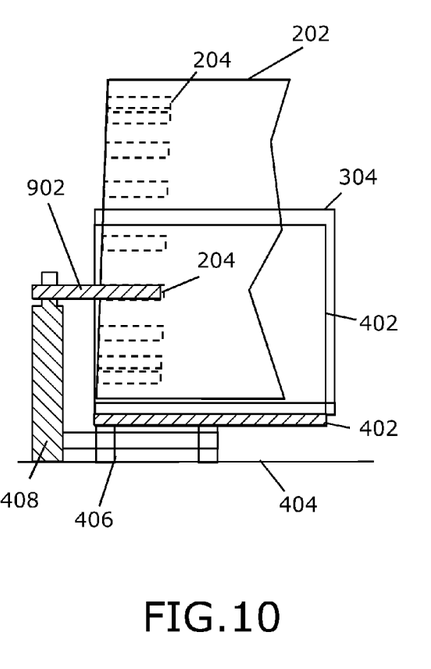
FIG. 10 illustrates the WT spar fixture according to the second embodiment when supporting the spar.

FIG. 10 illustrates the WT spar fixture in accordance with the second embodiment, the mould and its supporting structure being in a situation where the spar is supported by the spar fixture relative to the lower blade shell in the mould via a supporting element inserted in a bushing in the spar being supported in the spar fixture.

Figure 11:
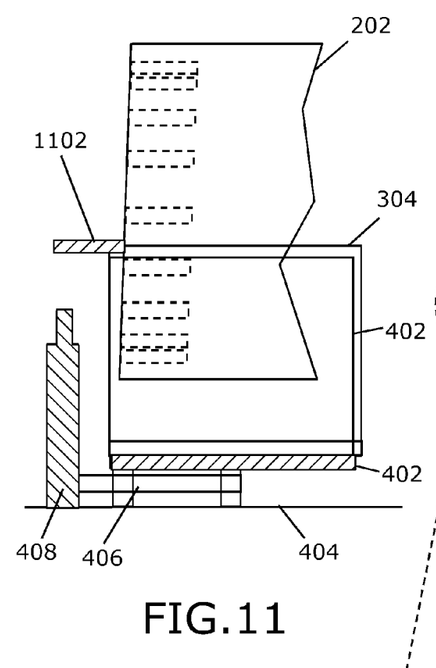
FIG. 11 is a side view of a third embodiment.
Figure 12:
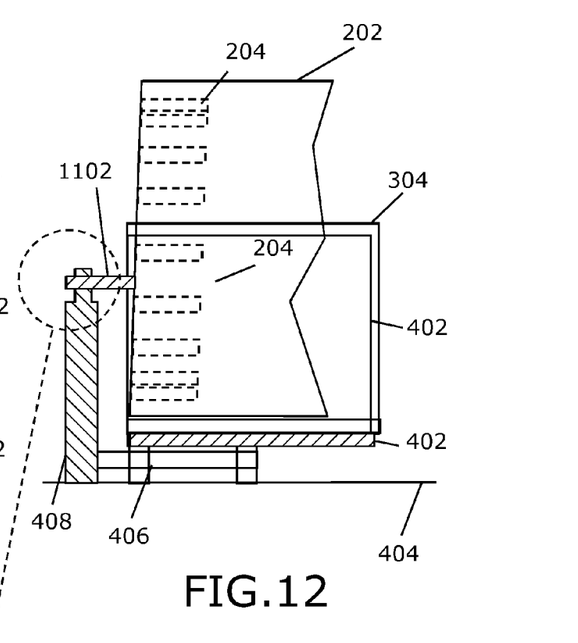
FIG. 12 is a side view of the WT spar fixture according to the third embodiment when supporting the spar fixture.

FIG. 11 illustrates a side view of a third embodiment of the spar fixture along with the mould etc., and FIG. 12 illustrates the WT spar fixture in accordance with the third embodiment, the mould and its supporting structure being in a situation where the spar is supported by the spar fixture relative to the lower blade shell in the mould by a protrusion 1102 extending from the root end of the spar. The spar fixture 408 in FIG. 11 is in an end view similar to the embodiment of the spar fixture shown in FIG. 8.

In an enlarged view there is shown an alternative supporting element 1204 and an alternative spar fixture 'interface'. The alternative supporting element 1204 may be attached to or in a root bushing or otherwise fixed to the spar and extending from the spar 202. When the spar with the alternative supporting element 1204 is lowered in the gravitational direction directly into an opening 1202 or hole 1202 in the spar fixture, the fixed relative position between the spar and the mould and/or a blade shell in the mould is achieved.

Figure 13:
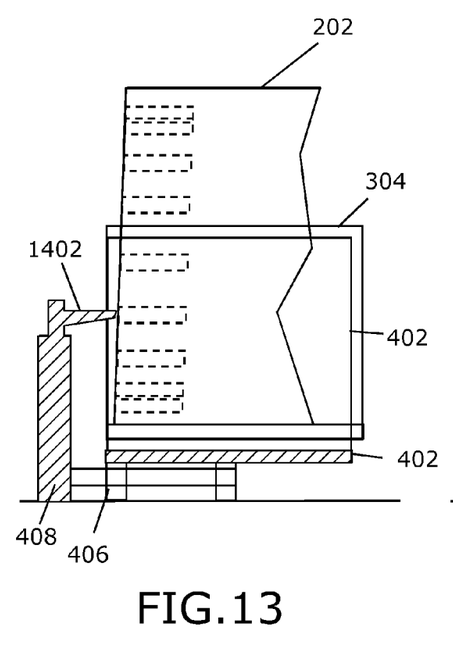
FIG. 13 illustrates a side view of a fourth embodiment of the spar fixture along with the mould, etc.
Figure 14:
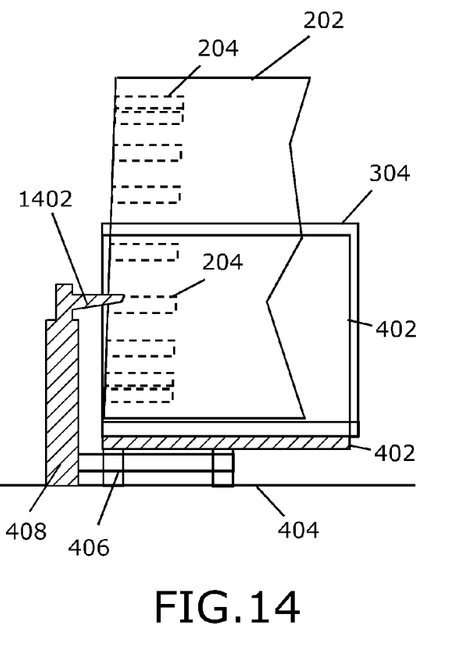
FIG. 14 is the WT spar fixture according to the fourth embodiment.

FIG. 13 illustrates a side view of a fourth embodiment of the spar fixture along with the mould etc., and FIG. 14 illustrates the WT spar fixture in accordance with the fourth embodiment, the mould and its supporting structure being in a situation where the spar is supported by the spar fixture relative to the lower blade shell and/or the mould by the spar including an indentation, such as an opening or a root bushing in the spar, for hooking up with a protrusion 1402 or the like of the spar fixture 202.

Figure 15:
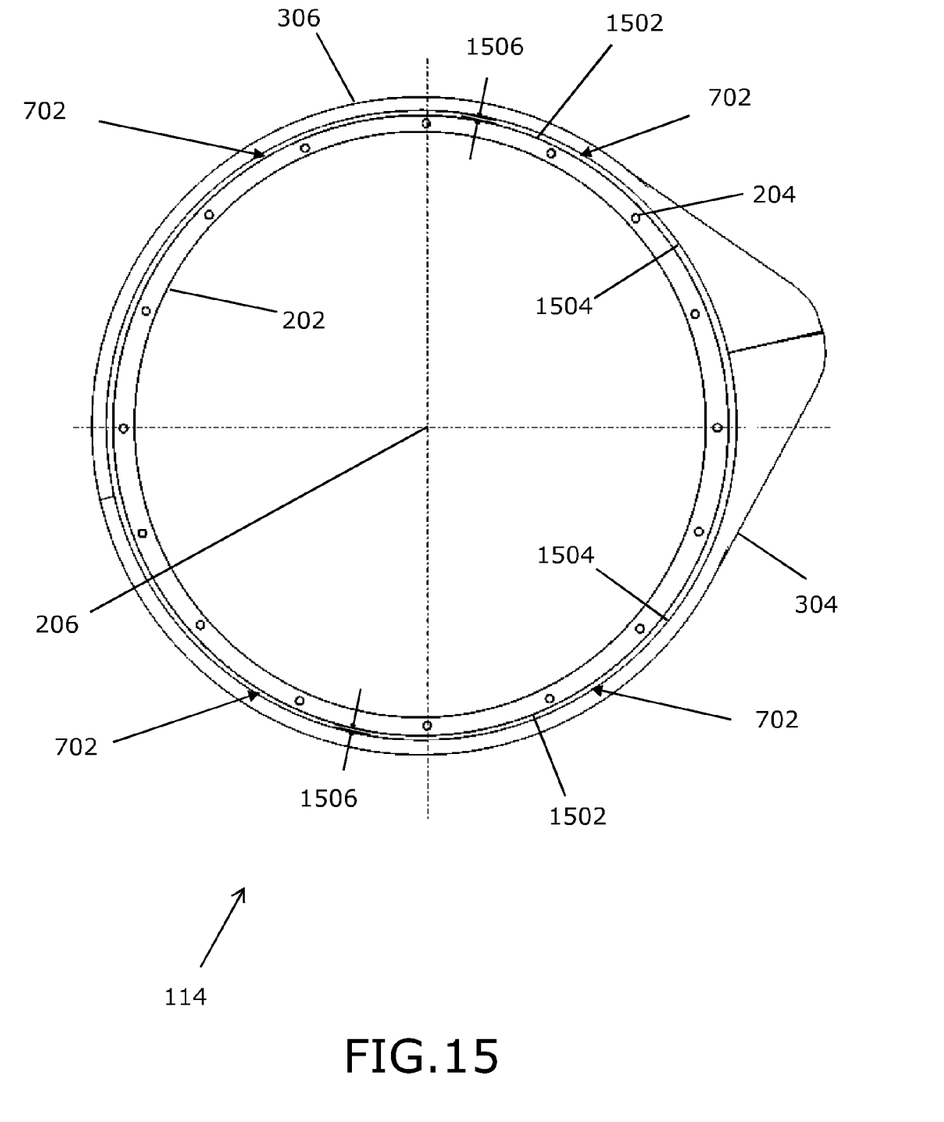
FIG. 15 shows a WT blade in accordance with an embodiment of the invention from the root end of the WT blade.

FIG. 15 shows a WT blade from the root end of the WT blade. In particular it is illustrated that the WT blade includes an outermost surface 1502 (shown in end view, though), two blade shells 304 and 306. Each blade shell has an innermost surface 1504 (shown in end view, though), towards the outermost surface 1502 of the spar 202. The two blade shells 304 and 306 are attached to the spar and to each other, and at least adjacent to a root end of the spar there is substantially the same distance 1506 between the innermost surface 1504 of each of the blade shells 304, 306 and the outermost surface 1502 of the spar 202. Only a layer 702 of cured or curable adhesive 702 or resin is provided in a space 702 between the innermost surface of the blade shells 304, 306 and the outermost surface of the spar 202. For purpose of illustration, the adhesive is shown as transparent in the figure.

In short, it is disclosed herein that within the field of wind turbines generators (WTG) 102, for example, in order to provide a consistent way of manufacturing a WT blade 110, there is disclosed a blade mould 402 and a blade spar fixture 408 to support the spar 202 in the mould so as to provide a fixed predetermined relative position, and preferably also orientation, between at least a root end, such as a bushing 204 in the root end of the blade spar 202, and a root end of the mould. Overall consistency is also obtained in that hereby a blade with anticipated aerodynamic and strength characteristics is provided, among others in that at least adjacent to the root of the spar there is substantially the same distance for a cured adhesive between an innermost surface 1504 of each of blade shells 304, 306 and an outermost surface 1502 of the spar.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality.

What is claimed is:

1. A method of manufacturing a wind turbine blade having a wind turbine blade spar, comprising:
    obtaining a lower part of a wind turbine blade mould, wherein the lower part of the wind turbine blade mould is supported by a support structure;
    providing a wind turbine blade shell in the lower part;
    positioning a wind turbine blade spar adjacent to the wind turbine blade mould; and
    engaging a root end of the wind turbine blade spar with a spar fixture that operates as a support between the root end of the wind turbine spar and at least one of the lower part of the wind turbine blade mould, the support structure that supports the lower part of the wind turbine blade mould, and the ground, wherein the spar fixture supports the wind turbine blade spar relative to the wind turbine blade shell to provide a fixed predetermined relative position between at least the root end of the wind turbine blade spar and at least a root end of the wind turbine blade shell in the wind turbine blade mould.

2. The method according to claim 1, wherein engaging the root end of the wind turbine blade spar with the spar fixture further comprises:
    coupling a supporting element to the wind turbine blade spar; and
    engaging the supporting element to the spar fixture.

3. The method according to claim 2, wherein coupling the supporting element to the wind turbine blade spar further comprises inserting the supporting element into an opening in a root end of the wind turbine blade spar.

4. The method according to claim 3, wherein inserting the supporting element into an opening in a root end of the wind turbine blade spar further comprises inserting the supporting element into a root bushing configured for attaching the wind turbine blade spar to a wind turbine hub.

5. The method according to claim 2, wherein engaging the supporting element to the spar fixture further comprises moving the wind turbine blade spar having the supporting element coupled thereto in a gravitational direction such that the supporting element engages with an opening in the spar fixture.

6. The method according to claim 5, wherein the supporting element includes an L-shaped member having a first leg coupled to an opening in a root end of the wind turbine blade spar and a second leg extending in a gravitational direction, wherein moving the wind turbine blade spar in the gravitational direction engages the second leg with a hole in the spar fixture.

7. The method according to claim 2, wherein engaging the supporting element to the spar fixture further comprises engaging two points in a root end of the wind turbine blade spar with the spar fixture, the two points being offset from a centre axis of the wind turbine blade spar.

8. The method according to claim 1, wherein engaging the root end of the wind turbine blade spar with the spar fixture further comprises:
    aligning an opening in the wind turbine blade spar with a hole in the spar fixture; and
    inserting a supporting element through the hole in the spar fixture and into the opening in the blade spar.

9. The method according to claim 8, wherein inserting the supporting element into the opening in the wind turbine blade spar further comprises inserting the supporting element into a root bushing configured for attaching the wind turbine blade spar to a wind turbine hub.

10. The method according to claim 1, wherein engaging the root end of the wind turbine blade spar with the spar fixture further comprises inserting a protrusion on the spar fixture into an opening in a root end of the wind turbine blade spar.

11. The method according to claim 10, wherein inserting the protrusion into the opening in the wind turbine blade spar further comprises inserting the protrusion into a root bushing configured for attaching the wind turbine blade spar to a wind turbine hub.

12. The method according to claim 1, wherein supporting the wind turbine blade spar relative to the lower wind turbine blade shell further comprises preventing rotation of the wind turbine blade spar relative to a centre axis of the root end of the wind turbine blade spar.

13. The method according to claim 1, further comprising providing a layer of curable adhesive in the space between the outer surface of the wind turbine blade spar and the inner surface of the lower wind turbine blade shell.

14. The method according to claim 13, wherein providing a layer of curable adhesive further comprises applying the curable adhesive to at least one of the outer surface of the wind turbine blade spar and the inner surface of the lower wind turbine blade shell prior to positioning the wind turbine blade spar adjacent to the lower part of the wind turbine blade mould such that the curable adhesive substantially fills the space.

15. The method according to claim 1, wherein supporting the wind turbine blade spar relative to the lower wind turbine blade shell further comprises creating a space between the outer surface of the wind turbine blade spar and the inner surface of the lower wind turbine blade shell at least at a root end of the wind turbine blade spar, the space defining a substantially constant distance therebetween along a circumference of the lower wind turbine blade shell.

16. The method according to claim 1, further comprising attaching an upper wind turbine blade shell to the lower wind turbine blade shell and to the wind turbine blade spar so that at least at a root end of the spar, a fixed predetermined relative positioning between an outer surface of the wind turbine blade spar and an inner surface of the upper wind turbine blade shell is established.

17. The method according to claim 16, wherein establishing a fixed predetermined relative positioning further comprises creating a space between the outer surface of the wind turbine blade spar and the inner surface of the upper wind turbine blade shell at least at a root end of the wind turbine blade spar, the space defining a substantially constant distance therebetween along a circumference of the upper wind turbine blade shell.

* * * * *